April 2, 1940.  J. J. SPROUSE ET AL  2,196,086
BULLNOSE PLASTER GROUND MOLDING
Filed Sept. 14, 1938  2 Sheets-Sheet 1
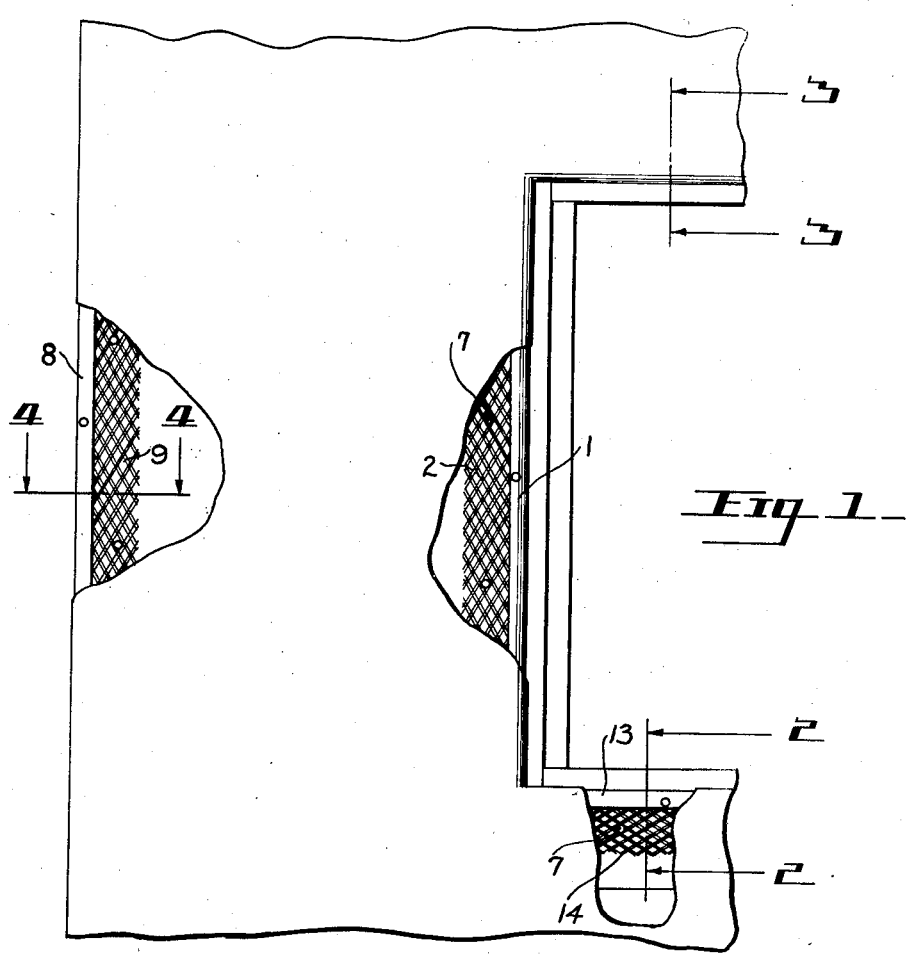
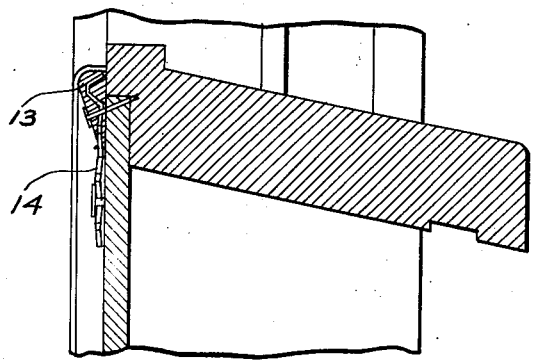
INVENTORS.
James J. Sprouse and
BY George R. Heitzman
A.B.Bowman
ATTORNEY.

April 2, 1940.                J. J. SPROUSE ET AL                    2,196,086
                          BULLNOSE PLASTER GROUND MOLDING
                          Filed Sept. 14, 1938        2 Sheets-Sheet 2
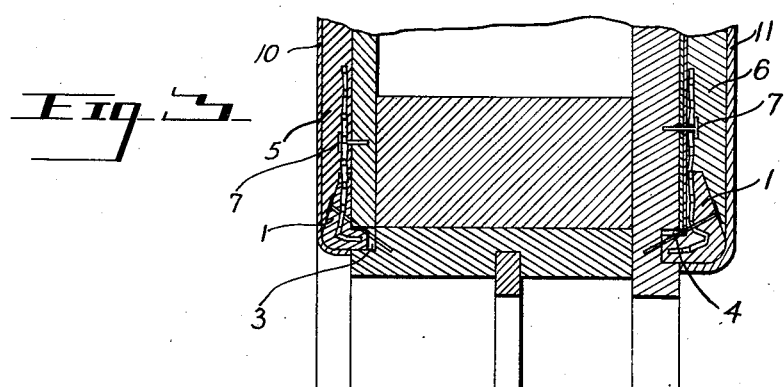
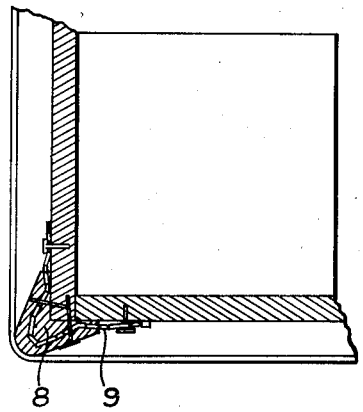
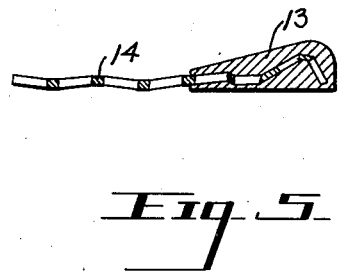
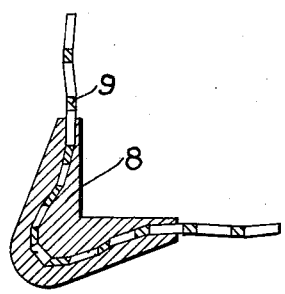
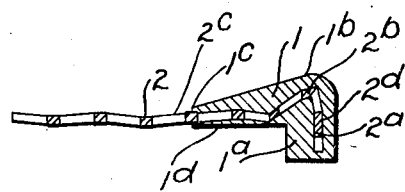
INVENTORS.
James J. Sprouse and
George R. Heitzman
BY A. B. Bowman
ATTORNEY.

Patented Apr. 2, 1940

2,196,086

UNITED STATES PATENT OFFICE 2,196,086

BULLNOSE PLASTER GROUND MOLDING

James J. Sprouse and George R. Heitzman, San Diego, Calif.; said Heitzman assignor to said Sprouse Application September 14, 1938, Serial No. 229,914

6 Claims. (Cl. 72—125)

Our invention relates to a plaster ground molding or foundation for finishing around windows, doors and at the corners and usually termed bullnose and the objects of our invention are:

First, to provide a pre-prepared bullnose plaster ground molding for around windows, doors, corners and the like;

Second, to provide a pre-prepared molding of this class which provides a uniform foundation for the finishing plaster around the doors, windows, corners and the like;

Third, to provide a molding of this class which eliminates the necessity of preparing the reenforcing and foundation on the ground preparatory to bullnose plastering;

Fourth, to provide a pre-prepared foundation molding of this class which provides a smooth, substantial, strong plaster ground molding for bullnose purposes;

Fifth, to provide a foundation of this class which may be readily secured and nailed in position, thus reducing the plasterer's time on jobs of this class to a minimum;

Sixth, to provide a bullnose plaster ground molding of this class which is pre-prepared and can be made of the proper length to fit the varying sized windows, doors, corners and the like and all ready to be applied in position ready for applying the plaster;

Seventh, to provide a plaster ground molding of this class which is so constructed that it may be readily cut for various lengths on the ground if desired;

Eighth, to provide a plaster ground molding of this class which is shaped and arranged to fit into the rabbeted groove of the window and door frame and nailed thereto so that it is then ready for use for plastering and the plasterer fills the space between the molding either between two windows or a window and door or two doors or between a window and a corner.

Ninth, to provide a plaster ground molding of this class which provides the proper shape and form for plastering over to make a uniform and practical finish surface of this class;

Tenth, to provide a plaster ground molding of this class which covers nearly all of the window and door frame with a dry combination of reenforcing and plaster, thus reducing to a minimum the liability of too much moisture on the frame and causing the frame to swell, get water soaked and later shrink away from the set plaster and cause cracks, breaks and causes difficulty in fitting the doors and windows in the frame;

Eleventh, to provide a plaster ground molding of this class that will provide the plasterer a true edge or ground of thickness, shape, or form so that he can work successfully leaving uniform true and proper thickness walls and all margins around the windows, doors and corners; and Twelfth, to provide a plaster ground molding of this class which is very simple and economical of construction, easy to apply, easy to plaster over, efficient in its action and which will not readily deteriorate or get out of order.

With these and other objects in view as will appear hereinafter, our invention consists of certain novel features of construction, combination and arrangement of parts and portions, as will be hereinafter described in detail and particularly set forth in the appended claims, reference being had to the accompanying drawings and to the characters of reference thereon which form a part of this application in which:

Figure 1 is a fragmentary side elevational view of a building wall showing the corner and a window frame and showing portions broken away to facilitate the illustration; Fig. 2 is an enlarged transverse sectional view taken from the line 2—2 of Fig. 1 and showing some of the portions in elevation to facilitate the illustration; Fig. 3 is a sectional view taken from the line 3—3 of Fig. 1; Fig. 4 is an enlarged sectional view taken from the line 4—4 of Fig. 1; Fig. 5 is a transverse sectional view of the bullnose plaster ground molding used in some cases at the bottom of the window; Fig. 6 is a similar view of the bullnose plaster ground molding used at the sides and top of the window or door, and Fig. 7 a similar view of the molding used at the corners, the structure shown in Figs. 6 and 7 used in both the interior and exterior of the walls of the building.

Similar characters of reference refer to similar parts and portions throughout the several views of the drawings:

The bullnose plaster ground molding as shown in Fig. 6 of the drawings is the specific type of pre-prepared plaster ground molding used at both sides of the top of window and door frames and sometimes used at the bottom of the window frame. However, in some cases the extended portion 1a of the member 1 as well as the reenforcing therein 2a of the reenforcing member 2 is omitted so that the structure is as shown in Fig. 5 where the lower side of the window frame is not rabbeted. Therefore this frame molding member as shown in Fig. 5 is used in such cases and the only difference between the molding on the interior of the wall from that on the exterior of the wall is that on the exterior the member 1 is made heavier to provide for a heavier coating of plaster on the exterior surface and the material of the member 1 on the exterior is made from cement, while that on the interior is made from plaster materials, the requirements for the exterior of the walls being considerably heavier and of cement rather than plaster. These members 1 are molded in the forms shown in Fig. 6 of the drawings in molds pre-prepared for that purpose of the proper thickness so that the plaster may be filled in even with the rounded portion 1b, shown in Fig. 6 of the drawings, the plaster being shown filled in in Fig. 3.

When the member 1 is molded it is molded with the reenforcing 2 positioned therein and molded therein, it being provided with a turned portion 2b and with a substantially straight portion 2c and with another substantially straight end 2d which is positioned in the portion 1a of the member 1. The structure shown in cross section in Fig. 6 is substantially the full size of the average wall construction. It tapers backwardly from the rounded portion 1b to a substantially thin edge at 1c with sufficient material to cover the reenforcing member 2 at both sides, while it is provided with a substantially straight surface on its inner side at 1d which extends up to the extended portion 1a which extends into the rabbeted portion of the window or door frame, the rabbeted portion being designated 3 on the interior of the frame and 4 on the exterior of the frame in Fig. 3 of the drawings.

The reenforcing 2 is of conventional type except that it is shaped to conform to a certain extent to the shape of the plaster member 1 for which it serves as a reenforcement. This reenforcing 2 extends outwardly some distance from the edge 1c of the member 1 and forms the support for the main plaster 5 on the interior and 6 on the exterior as shown best in Fig. 3 of the drawings. The straight portion 2c is secured to the frame by means of nails 7 which are driven through the openings in the wire. Nails may also be driven through the portion 1 between the rounded portion 1b and the edge 1c and through open portions of the wire for supporting the plaster ground holding in position rigidly on the frame.

In the cases where the lower portion of the window frame is not rabbeted and is smooth surface, the foundation member as shown in Fig. 5 is secured to the lower side of the window frame by nailing as hereinbefore described. In order to provide a corner plaster ground molding of this bullnose type, a plaster member substantially as shown in Fig. 7 is molded in forms prepared for such purposes which we have designated 8 and it is provided with a reenforcing member 9 and all molded together as shown best in Fig. 7 of the drawings and is applied on the corner as shown best in Fig. 4 of the drawings by nails through the reenforcing 9 and may be used on either the interior or exterior of the building at the corners, the difference between the exterior and the interior is that the exterior is heavier and made of cement rather than plaster material. After the corner members, as shown in Fig. 7, and the frame members, as shown in Fig. 6 are positioned, then the space between the corner members and the member 6 or between two window frame foundation members or a window and door foundation members and filled with plaster 5 or 6 as shown in Fig. 3 of the drawing. Thus the members 1 or 8 form the edge and proper thickness for filling in the plaster, of which the members 1 or 8 form the pre-prepared plaster edge. After this is filled the finished coat of plaster is laid over both the plaster 5 or 6 and the members 1 or 8, the finish coats being designated 10 and 11 as shown best in Fig. 3 of the drawings. The application of the member 13 to the lower side of the window frame is shown best in Fig. 2 of the drawings where the lower side of the frame is not rabbeted. This member is applied in the same way as the members 1 and the plaster filled between the members in the same way and the finished plaster placed over the same the same way.

Though we have shown and described a particular construction, combination and arrangement of parts and portions with a slight modification, we do not wish to be limited to this particular construction, combination and arrangement, nor to the modification, but desire to include in the scope of our invention the construction, combination and arrangement substantially as set forth in the appended claims.

Having thus described our invention, what we claim as new and desire to secure by Letters Patent is:

1. In a bullnose plaster ground molding, a prepared molded plaster member with a rounded outer surface and tapering gradually inwardly from said rounded surface and provided with a flat inner side adapted to rest against a wall frame, and a metallic reenforcing molded in said pre-prepared plaster member with one edge extending past the side thereof.

2. In a bullnose plaster ground molding, a pre-prepared molded plaster member with a rounded outer surface and tapering gradually inwardly from said rounded surface and provided with a flat inner side adapted to rest against a wall frame, a metallic reenforcing molded in said pre-prepared plaster member with one edge extending past the side thereof, said reenforcing being provided with a substantially curved portion conforming substantially to the curved portion of said pre-pared plaster member.

3. In a bullnose plaster ground molding, a pre-prepared molded plaster member with a rounded outer surface and tapering gradually inwardly from said rounded surface and provided with a flat inner side adapted to rest against a wall frame, a metallic reenforcing molded in said pre-prepared plaster member with one edge extending past the side thereof, said reenforcing being provided with a substantially curved portion conforming substantially to the curved portion of said pre-prepared plaster member, said plaster reenforcing member provided with an inwardly extending portion adapted to fit in the rabbeted portion of a window or door frame.

4. In a plaster ground molding of the class described, a pre-prepared member provided with a curved outer edge portion and tapering gradually therefrom, and a metallic reenforcing therein so that it is entirely embedded and conforming substantially thereto, with one edge extending some distance from the inner edge of said member.

5. In a plaster ground molding of the class described, a pre-prepared molded plaster member provided with a curved outer edge portion and tapering gradually therefrom, a metallic reenforcing molded therein so that it is entirely embedded and conforming substantially thereto, with one edge extending some distance from the inner edge of said plaster member, said pre-prepared plaster member provided with an inner side adapted to conform to the frame of the building on which it is applied.

6. In a bullnose plaster ground molding of the class described, a pre-prepared molded plaster member provided with a curved portion at its outer extremity and provided with inwardly extending straight portions therefrom, provided with a wall frome conforming inner surface, and a metallic reenforcing molded in said plaster member in substantially curved form conforming to said plaster member and provided with one edge extending some distance from the inner edge thereof.

JAMES J. SPROUSE.
GEORGE R. HEITZMAN.